(12) United States Patent
Roden

(10) Patent No.: US 7,885,985 B2
(45) Date of Patent: Feb. 8, 2011

(54) SYSTEM AND METHOD FOR BUILDING A DATASTORE FOR STORING AND RETRIEVING REGRESSION TESTING DATA FOR A COMPLEX APPLICATION

(75) Inventor: Bari Jane Roden, Apalachin, NY (US)

(73) Assignee: International Business Machines Corporation, Armonk, NY (US)

( * ) Notice: Subject to any disclaimer, the term of this patent is extended or adjusted under 35 U.S.C. 154(b) by 447 days.

(21) Appl. No.: 12/117,782

(22) Filed: May 9, 2008

(65) Prior Publication Data

US 2009/0282071 A1 Nov. 12, 2009

(51) Int. Cl.
*G06F 17/30* (2006.01)
(52) U.S. Cl. .................................... 707/804; 707/810
(58) Field of Classification Search .................. 707/804
See application file for complete search history.

(56) References Cited

U.S. PATENT DOCUMENTS

| | | | |
|---|---|---|---|
| 5,761,408 A * | 6/1998 | Kolawa et al. ............... 714/38 |
| 5,784,553 A * | 7/1998 | Kolawa et al. ............... 714/38 |
| 6,192,108 B1 | 2/2001 | Mumford et al. |
| 6,233,573 B1 * | 5/2001 | Bair et al. ......................... 1/1 |
| 6,301,701 B1 * | 10/2001 | Walker et al. ............... 717/125 |
| 6,701,308 B1 * | 3/2004 | Chen et al. .................. 715/200 |
| 6,769,114 B2 | 7/2004 | Leung |
| 6,904,430 B1 * | 6/2005 | Livshits .......................... 1/1 |
| 6,954,759 B2 * | 10/2005 | Yamaguchi ................ 711/101 |
| 7,603,660 B2 * | 10/2009 | Davia et al. ................. 717/128 |
| 2003/0018932 A1 * | 1/2003 | Blum et al. ................... 714/46 |
| 2004/0107205 A1 * | 6/2004 | Burdick et al. .............. 707/102 |
| 2008/0307263 A1 * | 12/2008 | Coulter et al. ................ 714/37 |

OTHER PUBLICATIONS

Korel et al., "Automated Regression Test Generation," ISSTA 98, Clearwater Beach FL USA, pp. 143-152.
Rothermel et al., "A Safe, Efficient Regression Test Selection Technique," ACM Transactions on Software Engineering and Methodology, vol. 6, No. 2, Apr. 1997, pp. 173-210.
Rothermel et al., "Selecting Regression Tests for Object-Oriented Software," IEEE 1994, pp. 14-25.

* cited by examiner

*Primary Examiner*—Don Wong
*Assistant Examiner*—Binh V Ho
(74) *Attorney, Agent, or Firm*—Schmeiser, Olsen & Watts; John R. Pivnichny

(57) ABSTRACT

A system and associated method for building a datastore for storing and retrieving regression testing data for a complex application. The datastore receives a first input data, a first output data, a second input data, and a second output data. The datastore compares first input data to the second input data, modifying the first input data for use regression testing the complex application. The modified first input data is next used to regression test the complex application. The datastore receives the modified first output data from the complex application, comparing the modified first output data to the second output data. The datastore identifies discrepancies between the modified first output data and the second output data and sends a list of the discrepancies to an Application Expert.

18 Claims, 7 Drawing Sheets

Datastore
300

| 01 | 1A2B3C4D5E |
|---|---|
| 02 | 6F7G8H9I0J |
| 03 | 1K2L3M4N5O |
| 04 | 6P7Q8R9S0T |
| 05 | 1U2V3W4X5Y |
| 06 | PASS |
| 07 | PASS |
| 08 | FAIL |
| 09 | PASS |
| 10 | FAIL |
| 11 | 1A2B3C4D5E |
| 12 | 6F7G8H9I0J:57691:251337 |
| 13 | 1K2L3M4N5O:19800624:2009 |
| 14 | 1U2V3W4X5Y |
| 15 | 6P7Q8R9S0T |
| 16 | PASS |
| 17 | FAIL |
| 18 | PASS |
| 19 | PASS |
| 20 | FAIL |

Rows 01–05: First input data 302
Rows 06–10: First output data 304
Rows 11–15: Second input data 306
Rows 16–20: Second output data 308

First Column 310 | Second Column 312

FIG. 3

Datastore
300

| | |
|---|---|
| 01 | 1A2B3C4D5E |
| 02 | 6F7G8H9I0J:57691:251337 |
| 03 | 1K2L3M4N5O:00000000:0000 |
| 04 | 1U2V3W4X5Y |
| 05 | 6P7Q8R9S0T |
| 06 | PASS |
| 07 | FAIL |
| 08 | FAIL |
| 09 | PASS |
| 10 | FAIL |
| 11 | 1A2B3C4D5E |
| 12 | 6F7G8H9I0J:57691:251337 |
| 13 | 1K2L3M4N5O:19800624:2009 |
| 14 | 1U2V3W4X5Y |
| 15 | 6P7Q8R9S0T |
| 16 | PASS |
| 17 | FAIL |
| 18 | PASS |
| 19 | PASS |
| 20 | FAIL |

Modified first input data 702 — rows 01–05
Modified first output data 704 — rows 06–10
Second input data 306 — rows 11–15
Second output data 308 — rows 16–20

First Column 310
Second Column 312

FIG. 7

SYSTEM AND METHOD FOR BUILDING A DATASTORE FOR STORING AND RETRIEVING REGRESSION TESTING DATA FOR A COMPLEX APPLICATION

FIELD OF THE INVENTION

The present invention discloses a system and associated method for building a datastore which stores and retrieves multiple versions of regression test data to facilitate regression testing a complex application.

BACKGROUND OF THE INVENTION

Conventional regression testing requires the creation of sample test data for each release of a complex application. As the complex application progresses through a software development lifecycle, previous regression test data becomes obsolete and new sample test data is required. Also, the nature of complex applications requires a multitude of sample input and output data. As the complex application progresses through the software development lifecycle, management of the sample input and output data becomes cumbersome.

Thus, there is a need for a system and associated method that overcomes at least one of the preceding disadvantages of current methods and systems for regression testing complex applications.

SUMMARY OF THE INVENTION

A method for building a datastore for storing and retrieving regression testing data for a complex application, said method comprising:

creating said datastore for said complex application to manage data for regression testing, wherein said datastore is a database table consisting of a plurality of rows and a plurality of columns residing in a relational database environment;

after said creating, receiving a first input data, a first output data, a second input data, and a second output data for said complex application;

after said receiving said first input data, said first output data, said second input data, and said second output data, comparing said first input data to said second input data;

after said comparing said first input data to said second input data, modifying said first input data, wherein said modifying renders said first input data compliant for a second release of said complex application;

after said modifying, sending a first modified first input data to said complex application for regression testing;

after said sending said first modified first input data, receiving from said complex application a first modified first output data;

after said receiving from said complex application said first modified first output data, comparing said first modified first output data with said second output data; and sending result from said comparing said first modified first output data with said second output data to an application expert.

The present invention provides a system and method that overcomes at least one of the current disadvantages of conventional methods.

BRIEF DESCRIPTION OF THE DRAWINGS

FIG. 3 illustrates the datastore containing first input data, first output data, second input data, and second output data, in accordance with the embodiments of the present invention.

FIG. 7 illustrates the datastore after the approved modifications have been performed, in accordance with the embodiments of the present invention.

DETAILED DESCRIPTION OF THE DRAWINGS

Although certain embodiments of the present invention are described herein, it is understood modifications may be made to the present invention without departing from its course and scope. Scope of the present invention is not limited to the number of constituting components, the materials thereof, the shapes thereof, the relative arrangement thereof, etc. Furthermore, while the accompanying drawings illustrate certain embodiments of the present invention, such drawings are not necessarily depicted to scale.

Figure 1:
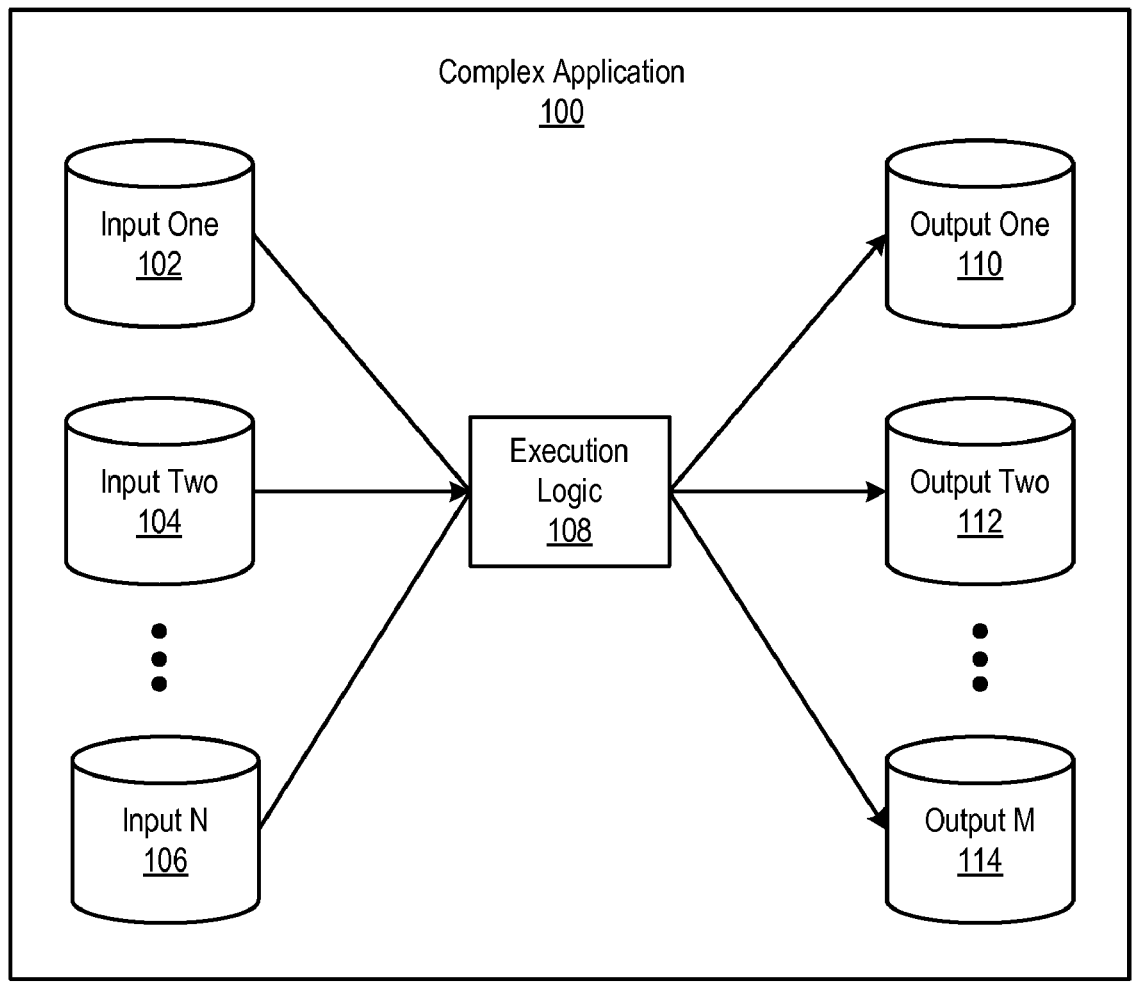
FIG. 1 illustrates a complex application containing multiple inputs, multiple outputs, and execution logic.

FIG. 1 illustrates a complex application 100 having input one 102 through input N 106, execution logic 108, and output one 110 through output M 114. The execution logic 108 receives input one 102 through input N 106, performs a plurality of calculations on the inputs, and stores the result in output one 110 through output M 114. The execution logic 108 may receive input one 102 through input N 106 is a variety of different formats including emails, database tables, flat files, XML files, etc. Similarly, output one 110 through output M 114 may be stored in a variety of formats.

During development of the complex application 100, regression testing is used to ensure the execution logic 108 produces valid outputs when sent valid inputs and produces errors when sent invalid inputs. Regression testing is the process of validating modifications made to the complex application 100 to ensure that no errors are introduced into the previously tested execution logic 108. Fundamentally, regression testing reuses previously successful test data and compares the new results with earlier valid results. Conventionally when the complex application 100 moves from a first release to a second release, input data and output test data for the first release is used to check for new errors in the second release of the complex application 100. The first input data 302 (see FIG. 3, infra) is loaded into input one 102 through input N 106, the execution logic 108 performs a plurality of calculations on the inputs, and stores the result in output one 110 through output M 114. Output one 110 through output M 114, collectively known as the first output data 302 (see FIG. 3, infra) is then compared to the second output data 308 (see FIG. 3, infra) and any discrepancies would demonstrate an error in the execution logic 108.

As the complex application 100 progresses through a software development lifecycle, new features may be added, obsolete features removed, and current features optimized. As a result, input one 102 through input N 106 and output one 110 through output M 114 may change accordingly. In one example, the input two 104 is obsolete removed in the second release of the complex application 100. In another example, output two 112 contains additional and/or different information from the first to second release of the complex application 100. Consequently, removing input two 104 and/or modifying output two 112 renders the first input data 302 (see FIG. 3, infra) useless. Furthermore, creating and storing multiple test case scenarios for each release of the complex application 100 becomes difficult to manage efficiently.

The present invention overcomes at least one of the disadvantages of the conventional method of regression testing by creating a datastore to manage regression test data.

Figure 2:
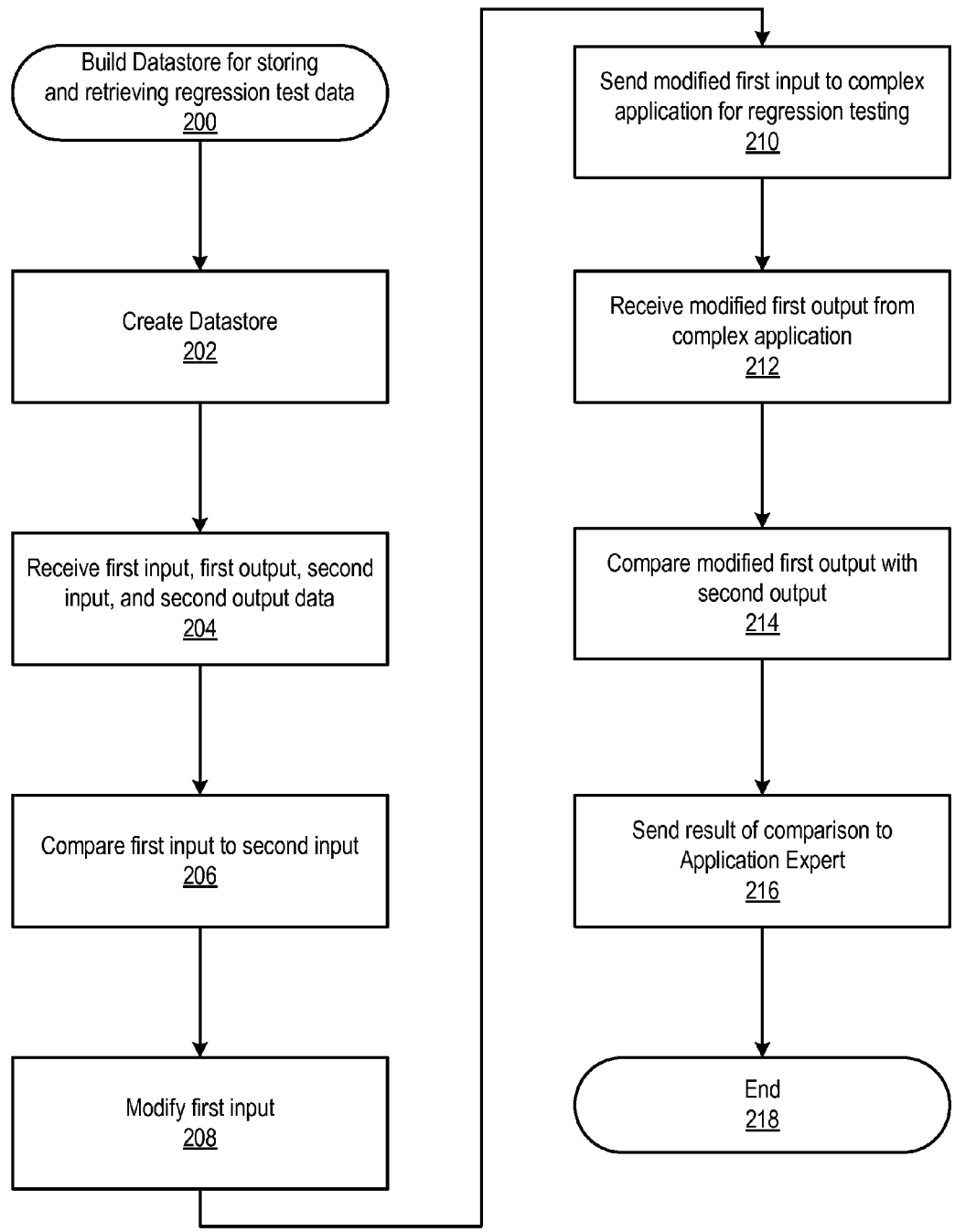
FIG. 2 illustrates a method for building a datastore for storing and retrieving regression test data for the complex application, in accordance with the embodiments of the preset invention.

FIG. 2 illustrates a method for building a datastore for storing and retrieving regression test data for the complex application 100, in accordance with the embodiments of the preset invention. The method 200 of building a datastore for storing and retrieving regression test data begins with step 202 which creates the datastore.

Step 202 builds a database table consisting of a plurality of rows and a plurality of columns in a relational database environment (see datastore 300 detailed in FIG. 3, infra). After completion of step 200, the method continues with step 204 which receives a first input data 302, a second input data 304, a first output data 306, and a second output data 308.

Step 204 receives and stores regression test data used to test the complex application 100. The datastore 300 (see FIG. 3, infra) receives and stores the first input data 302, the first output data 304, the second input data 306, and the second output data 308. After completion of step 204, the method continues with step 206 which compares the first input data 302 to the second input data 306.

Step 206 identifies differences between the first input data 302 and the second input data 306. A detailed discussion of step 206 is made with respect to FIG. 4, infra. After completion of step 206, the method continues with step 208 which modifies the input data 302.

Step 208 alters the first input data 302 in accordance with a second control card 600 (see FIG. 6, infra) received from an Application Expert. The format and contents of the second control card 600 are discussed in detail with respect to FIG. 6, infra. The datastore 300 performs each action listed in the second control card. After completion of step 208, the method continues with step 210 which sends modified input data 702 (see FIG. 7, infra) to the complex application 100 for testing.

Step 210 tests the complex application 100 using the modified first input data 702 (see FIG. 7, infra) as input. Each row of the modified first input data 702 is retrieved from the datastore 300 and placed in the appropriate input location (input one 102 through input N 106) in the complex application 100. The execution logic 108 receives input one 102 through input N 106, performs a plurality of calculations on the inputs, and stores the result in output one 110 through output M 114. After the calculations made by the execution logic 108, the contents of output one 110 through output M 114 are collectively identified as the modified first output data 704 (see FIG. 7, infra). Here, the complex application 100 sends the modified first output data 704 to the datastore 300 for a comparison. After completion of step 210, the method continues with step 212 which receives modified first output data 704 from the complex application.

Step 212 receives the modified first output data 704 from the complex application 100. The datastore 300 purges previously stored first output data 304 and stores the modified first output data 704 in its place. Note, the modified first input data 702 does not need to be stored in the datastore 300, first input data 302 was modified directly in the datastore 300 pursuant to step 208 which modified the first input data 302, supra. After completion of step 212, the method continues with step 214 which compares modified first output data 704 with second output data 308.

Step 212 validates modifications made to the execution logic 108 from the first release to the second release of the complex application 100. If the execution logic 108 was modified correctly, the modified first output data 704 will match the second output data 308. The method compares each row in the modified first output data 704 to a row in the same position in the second output data 308. For example, the third row in the modified first output data 704 is compared to the third row in the second output data 308. (Note, the row position only refers to the position with respect to the given release of output data; the row position does not refer to the row number in the datastore 300.) Each row of modified first output data 704 which does not match the corresponding row of the second output data 308 satisfies a fourth condition. The method writes a third control card 800 (see FIG. 8, infra) which contains a label 802 describing the card as a list of discrepancies found during the output comparison. Following the label 802, the third control card contains a list of rows which satisfy the fourth condition 804, the fourth condition being that rows in the modified first output data 704 do not match corresponding rows in the second output data 308. After completion of step 212, the method continues with step 214 which sends result of the comparison to the Application Expert.

Step 214 simply submits the third control card 800 to the Application Expert for review. After completion of step 214, the method ends 218.

FIG. 3 illustrates the datastore containing first input data, first output data, second input data, and second output data, in accordance with the embodiments of the present invention. The datastore 300 comprises a plurality of rows and columns residing in a relational database environment. In one embodiment of the present invention, the first column 310 in the datastore 300 contains row numbers used to identify rows in the first and second control cards for removal, insertion, and moving (see FIG. 5 and FIG. 6, infra, for a detailed description of the first and second control cards). The second column 312 in the datastore 300 contains the first input data 302, first output data 304, second input data 306, and second output data 308. In FIG. 3, the first input data 302 is stored in rows 01 through 05, in the datastore 300. In FIG. 3, the first output data 304 is stored in rows 06 through 10, in the datastore 300. In FIG. 3, the second input data 306 is stored in rows 11 through 15, in the datastore 300. In FIG. 3, the second output data 308 is stored in rows 16 through 20, in the datastore 300.

In one embodiment of the present invention, the data contained in second column 312 is formatted as character strings. Character string formatting enables the Application Expert to easily read data present in a given row. Character string formatting also allows for simplified comparisons without overhead at runtime of converting various formats to a single format for each comparison made on the datastore 300. Character string formatting also allows for data obfuscation in the event the contents of the datastore are inadvertently disclosed since it is difficult to determine how the multitude of rows are related. Finally, character string formatting allows for simplified searching of the datastore 300. Note, the format and position of data in the datastore 300 in FIG. 3 is for illustrative purposes only, an infinite combination of data types and formats may be used in the preset invention. Furthermore, the data contained in the datastore 300 may be in any code page and/or data representation as more and more we deal with double byte data for languages such as Japanese or Chinese.

Figure 4:
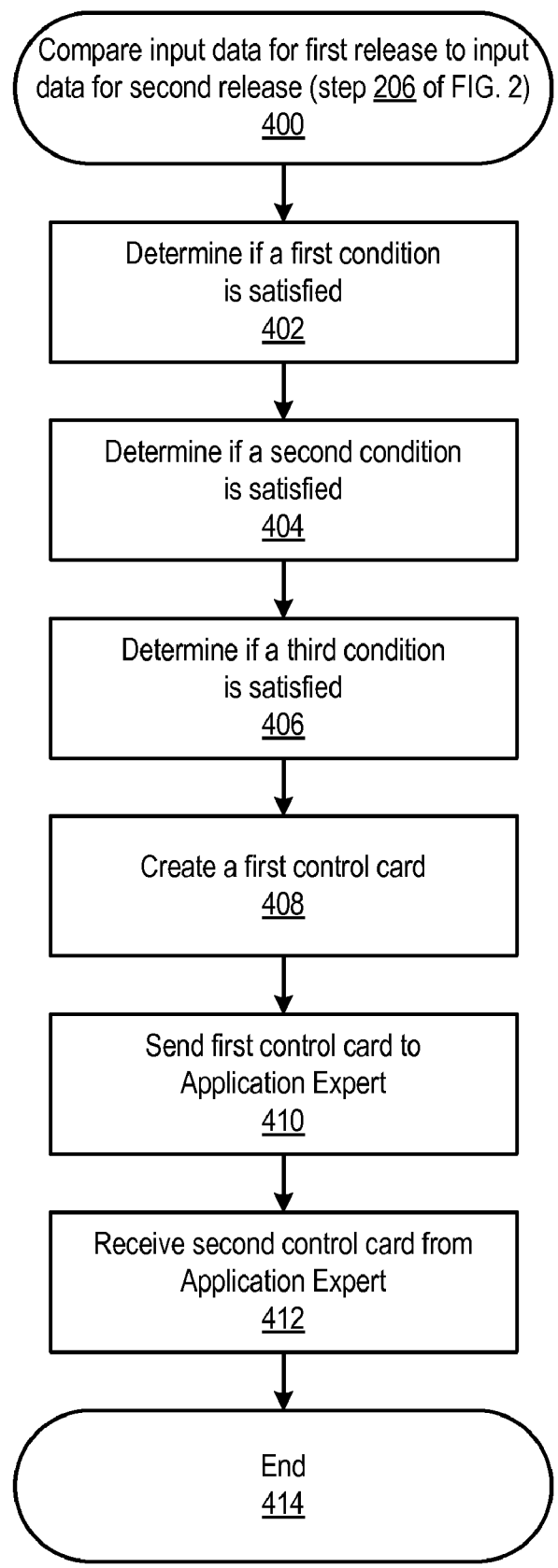
FIG. 4 illustrates a method of comparing the first input data with the second input data, in accordance with the embodiments of the present invention.

FIG. 4 illustrates a method of comparing the first input data 302 with the second input data 306, in accordance with the embodiments of the present invention. The method 400 of comparing the first input data 302 with the second input data 306 begins with step 402 which determines if a first condition is satisfied.

Step 402 establishes whether a row in the first input data 302 does not match any row in the second input data 306. Each row containing first input data 302 (rows 01 through 05 in FIG. 3, supra) is compared to all the rows containing second input data 306 (rows 11 through 15 in FIG. 3 supra). Satisfying the first condition occurs if a row in the first input data 302 does not match any row in the second input data 306.

For example, row 02 in FIG. 3, supra, is compared to all rows 11 through 15 in FIG. 3, supra. Row 02 satisfies the first condition since row 02 does not match any of the rows 11 through 15. After completion of step 402, the method continues with step 404 which determines if a second condition is satisfied.

Step 404 establishes whether a row in the second input data 306 does not match any row in the first input data 302. Each row contained in the second input data 306 (rows 11 through 15 in FIG. 3, supra) is compare to all the rows containing first input data 302 (rows 01 through 15 in FIG. 3, supra). Satisfying the second condition occurs if a row in the second input data 306 does not match any rows in the first input data 302.

For example, row 12 in FIG. 3, supra, is compared to all rows 01 through 05 in FIG. 3, supra. Row 12 satisfies the second condition since row 12 does not match any of the rows 01 through 05.

Note the combination of performing steps 402 and 404 identifies cases in which the second input data 306 includes additional data not present in the first input data 302. Row 12 in FIG. 3, supra, contains the same data as does row 02, "6F7G8H9I0J" with the additional data ":57691:251337". After completion of step 404, the method continues with step 406 which determines if a third condition is satisfied.

Step 406 establishes whether a row in the first input data 302 is not in the same position relative to the first input data 302 as is the position of a row with identical data in the second input data 306. The third condition is satisfied if a row in the first input data 302 is not in the same position in the first input data 302 as the row in the second input data 306 having the same data.

For example, row 04 in FIG. 3, supra, contains the identical data as row 15 in FIG. 3, supra. However, row 04 is the fourth row with respect to the first input data 302, but row 15 is the fifth row with respect to the second input data 306. Row 04 satisfies the third condition since row 04 is not in the same position in the first input data 302 as row 15 is in the second input data 306. After completion of step 406, the method continues with step 408 which creates a first control card.

Step 408 writes the first control card 500 (see FIG. 5, infra) after steps 402, 404, and 406 are completed. The first control card 500 contains a label describing the card as a list of potential modifications to make to the datastore 300. Following the label, the first control card 500 contains a list of rows which satisfy either the first condition, second condition, third condition, or a combination thereof, and a marker as to what action should be taken pursuant to each row identified. See FIG. 5 for a detailed example of the first control card.

After completion of step 408, the method continues with step 410 which sends the first control card 500 to the Application Expert.

Step 410 simply submits the first control card 500 to the Application Expert for review. The Application Expert reviews the list of potential modifications contained in the first control card 500 and either approve the list of potential modifications in total, approve a subset of the list of potential modifications, add an additional modification not present in the first control card, or a combination thereof. After the Application Expert reviews the first control card 500, said Application Expert sends a second control card 600 (see FIG. 6, infra) to the datastore 300 for implementation. The second control card 600 contains a list of approved modifications selected by the Application Expert.

Step 412 receives the second control card 600 which contains a list of approved modifications to perform on the datastore 300. Step 208, supra, utilizes the second control card 600 to perform the requisite modifications to the first input data 302. After completion of step 412, the method ends 414.

Figure 5:
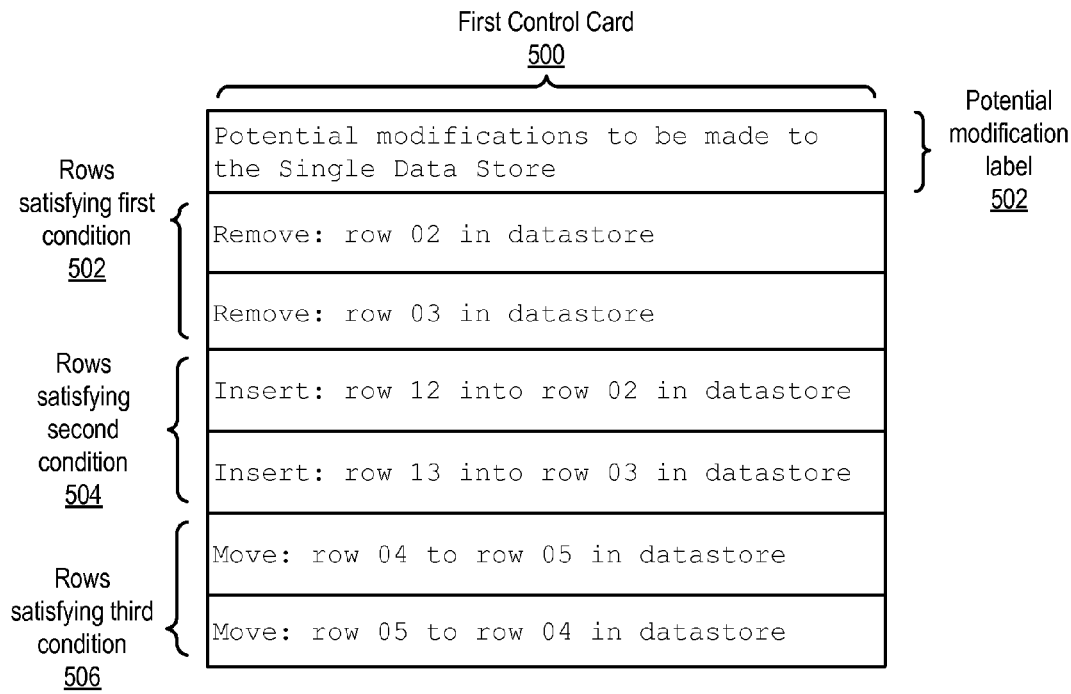
FIG. 5 illustrates a first control card containing a list of potential modifications to make to the datastore, in accordance with the embodiments of the present invention.

FIG. 5 illustrates a first control card 500 containing a list of potential modifications to make to the datastore 300, in accordance with the embodiments of the present invention. The first control card 500 comprises a potential modifications label 502 and a list of potential modifications to be made to the datastore 300. In FIG. 5, the first and second rows in the list of potential modifications are rows which satisfy the first condition 502. These rows correspond to data in the first input data 302 which do not match any of the rows in the second input data 306, satisfying the first condition and are marked for removal. In FIG. 5, the second and third rows in the list of potential modifications are rows which satisfy the second condition 504. These rows correspond to data in the second input data 306 which do not match any rows in the first input data 302, satisfying the second condition and are marked for insertion into the first input data 302. In FIG. 5, the fifth and sixth rows in the list of potential modifications are rows which satisfy the third condition 506. These rows correspond to data in the first input data 302 which are out of order in comparison to the data in the second input data 306, satisfying the third condition and are marked for rearrangement within the first input data 302. Note, the format and position of information contained in the first control card 500 in FIG. 5 is for illustrative purposes only, an infinite combination of formats may be used to convey the same information.

Figure 6:
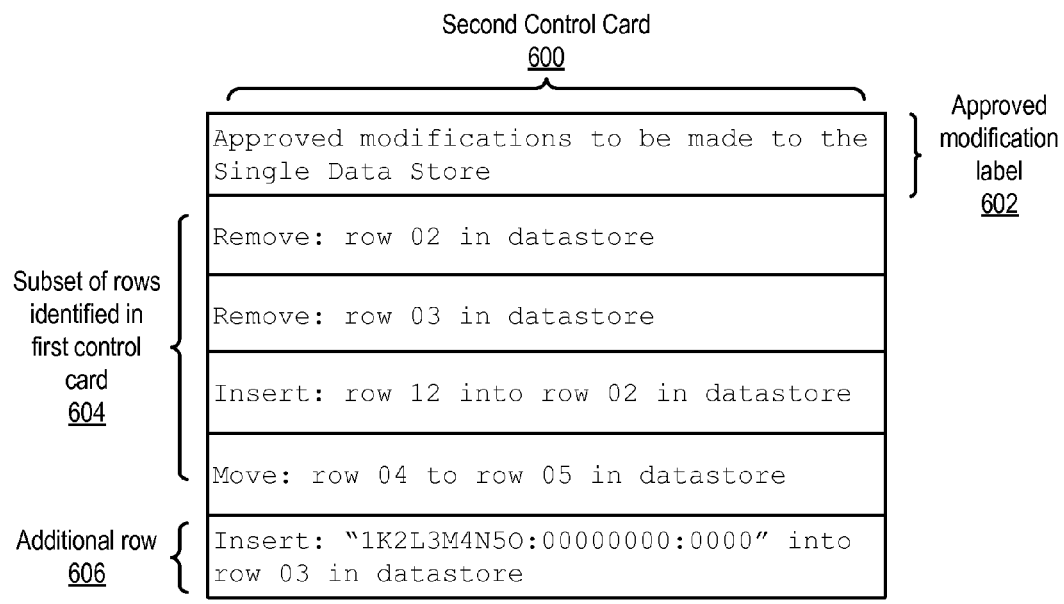
FIG. 6 illustrates a second control card containing a list of approved modifications to make to the datastore, in accordance with the embodiments of the present invention.

FIG. 6 illustrates a second control card 600 containing a list of approved modifications to make to the datastore 300, in accordance with the embodiments of the present invention. The second control card 600 comprises an approved modification label 602 and a list of approved modifications to be made to the datastore 300. In FIG. 6, the first through fourth rows in the list of approved modifications are a subset of rows identified in the first control card 604. 604 is a subset since the Application Expert removed the third potential modification from the first control card 500, "Insert: row 13 into row 03 in datastore". The Application Expert also removed the sixth potential modification from the first control card 500, "Move: row 05 to row 04 in datastore". The Application Expert likely understood that by performing the fifth potential modification in the first control card 500, "Move: row 04 to row 05 in datastore", the sixth potential modification was unnecessary. In one embodiment of the present invention, the step determine if a third condition is satisfied 406 would optimize the number of moves necessary to achieve the desired result of matching similar rows in the first input data 302 with second input data 306 in the same row respective of their release.

In FIG. 6, the fifth row in the list of approved modifications is an additional row 606 added by the Application Expert. Note, the format and position of information contained in the second control card 600 in FIG. 6 is for illustrative purposes only, an infinite combination of formats may be used to convey the same information.

FIG. 7 illustrates the datastore 300 after performance of the approved modifications, in accordance with the embodiments of the present invention. Modified first input data 702 is stored collectively in the second column 312, rows 01 through 05, in the datastore 300. The modified first input data 702 is a result of step 208 which modified the first input data, supra. Modified first output data 704 is stored collectively in the second column 312, rows 06 through 10, in the datastore 300. The modified first output data 704 is a result of step 212 which modified the first output data, supra. Note, the format and position of data in the datastore 300 in FIG. 7 is for illustrative purposes only, an infinite combination of data types and formats may be used in the preset invention.

Figure 8:
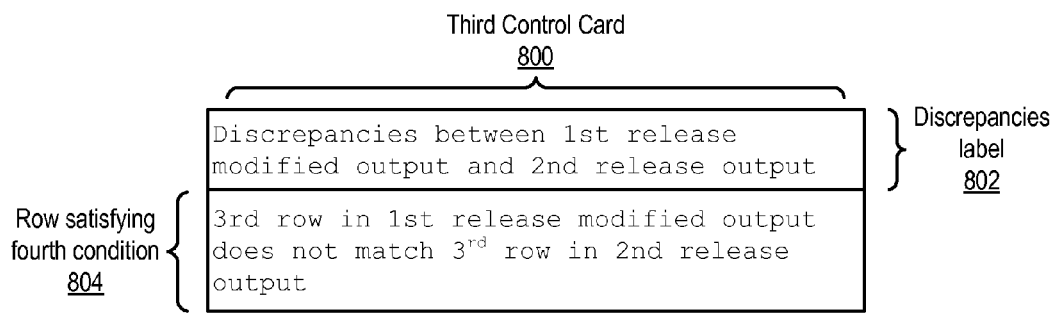
FIG. 8 illustrates a third control card containing a list of discrepancies in the datastore, in accordance with the embodiments of the present invention.

FIG. 8 illustrates a third control card 800 containing a list of discrepancies in the datastore 300, in accordance with the embodiment of the present invention. The third control card 800 comprises a discrepancies label 802 and a list of discrepancies between the modified first output data 704 and the second output data 308 contained in the datastore 300. In FIG. 8, the row satisfying the fourth condition 804 identifies that the third rows in the modified first output data 704 (row 08 in datastore 300 in FIG. 7, supra) and the second output data 308 (row 18 in datastore 300 in FIG. 7, supra) do not match.

In the example, this result should be expected by the Application Expert because rows 03 and 13 do not match in the datastore 300 in FIG. 7, and it is likely their subsequent outputs would not match. The Application Expert should remember row 03 in the datastore 300 (in FIG. 7, supra) was identified by the additional row 606 in FIG. 6, that the Application Expert added. Note, the format and position of information contained in the third control card 800 in FIG. 8 is for illustrative purposes only, an infinite combination of formats may be used to convey the same information.

Figure 9:
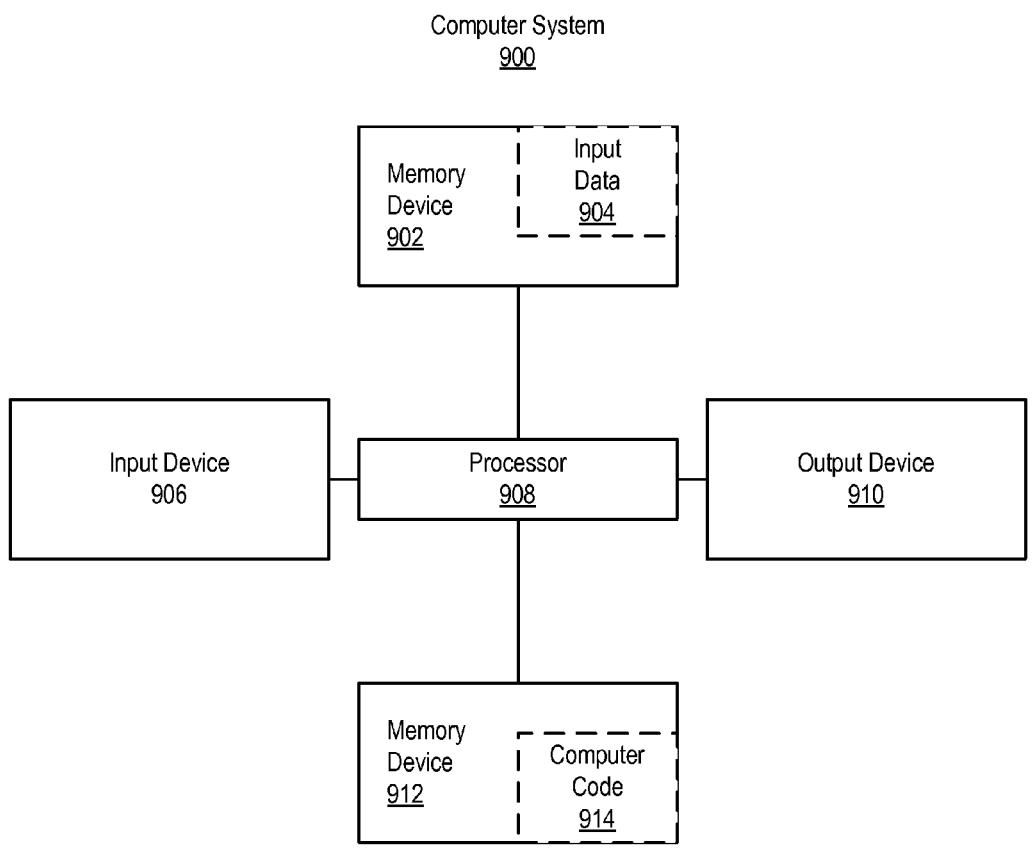
FIG. 9 illustrates a computer system used for building a datastore for storing and retrieving regression testing data for the complex application, in accordance with the embodiments of the preset invention.

FIG. 9 illustrates a computer system used for building a datastore for storing and retrieving regression testing data for the complex application, in accordance with the embodiments of the preset invention.

The computer system 900 comprises a processor 908, an input device 906 coupled to the processor 908, an output device 910 coupled to the processor 908, and memory devices 902 and 912 each coupled to the processor 908. The input device 906 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc. The output device 910 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 902 and 912 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 912 includes a computer code 914 which is a computer program that comprises computer-executable instructions. The computer code 914 includes, inter alia, an algorithm used for building a datastore for storing and retrieving regression test data according to the present invention. The processor 908 executes the computer code 914. The memory device 902 includes input data 904. The input data 904 includes input required by the computer code 914. The output device 910 displays output from the computer code 914. Either or both memory devices 902 and 912 (or one or more additional memory devices not shown in FIG. 9) may be used as a computer usable medium (or a computer readable medium or a program storage device) having a computer readable program embodied therein and/or having other data stored therein, wherein the computer readable program comprises the computer code 914. Generally, a computer program product (or, alternatively, an article of manufacture) of the computer system 900 may comprise said computer usable medium (or said program storage device).

Any of the components of the present invention can be deployed, managed, serviced, etc. by a service provider that offers to deploy or integrate computing infrastructure with respect to a process for building a datastore for storing and retrieving regression test data of the present invention. Thus, the present invention discloses a process for supporting computer infrastructure, comprising integrating, hosting, maintaining and deploying computer-readable code into a computing system (e.g., computing system 900), wherein the code in combination with the computing system is capable of performing a method for building a datastore for storing and retrieving regression test data.

In another embodiment, the invention provides a business method that performs the process steps of the invention on a subscription, advertising and/or fee basis. That is, a service provider, such as a Solution Integrator, can offer to create, maintain, support, etc. a process for building a datastore for storing and retrieving regression test data of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 9 shows the computer system 900 as a particular configuration of hardware and software, any configuration of hardware and software, as would be known to a person of ordinary skill in the art, may be utilized for the purposes stated supra in conjunction with the particular computer system 900 of FIG. 7. For example, the memory devices 902 and 912 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed:

1. A method for building a datastore for storing and retrieving regression testing data for a complex application, said method comprising:

creating said datastore for said complex application to manage data for regression testing, wherein said datastore is a database table consisting of a plurality of rows and a plurality of columns residing in a relational database environment;

after said creating, receiving a first input data, a first output data, a second input data, and a second output data for said complex application;

after said receiving said first input data, said first output data, said second input data, and said second output data, comparing said first input data to said second input data;

after said comparing said first input data to said second input data, modifying said first input data, wherein said modifying renders said first input data compliant for a second release of said complex application;

after said modifying, sending a first modified first input data to said complex application for regression testing;

after said sending said first modified first input data, receiving from said complex application a first modified first output data;

after said receiving from said complex application said first modified first output data, comparing said first modified first output data with said second output data; and sending result from said comparing said first modified first output data with said second output data to an application expert, said comparing said first input data to said second input data comprising:

determining if a first condition is satisfied, said first condition being that at least one row in said first input data does not match any row in said second input data;

determining if a second condition is satisfied, said second condition being that at least one row in said second input data does not match any row in said first input data;

determining if a third condition is satisfied, said third condition being that at least one row in said first input data matches a target row in said second input data but said row in said first input data is in a different position in said first input data first than said target row in said second input data is in said second input data;

after said determining if said first condition is satisfied, said determining if said second condition is satisfied, and said determining if said third condition is satisfied, creating a first control card, wherein said first control card comprises a list of potential modifications to perform on said first input data, wherein said list of potential modifications is selected from the group consisting of at least one row which satisfies said first condition, at least one row which satisfies said second condition, at least one row which satisfies said third condition, and a combination thereof;

sending said first control card to said application expert; and after said sending said first control card to said application expert, receiving a second control card from said application expert, wherein said second control card comprises a list of approved modifications to perform on said first input data, wherein said list of approved modifications is selected from the group consisting of a subset of said list of potential modifications, at least one additional modification, and a combination thereof.

2. The method of claim 1, said receiving a first input data, a first output data, a second input data, and a second output data for said complex application comprising:
receiving said first input data and said first output data;
receiving said second input data and said second output data;
storing said first input data and said first output data in said datastore; and
storing said second input data and said second output data in said datastore.

3. The method of claim 1, said first condition having been determined to be satisfied, said creating said first control card comprising:
labeling said first control card said list comprising potential modifications to be made to said datastore; and
listing a first row of said first input data which satisfies said first condition, wherein said first row satisfying said first condition is marked for removal from said first input data.

4. The method of claim 1, said second condition having been determined to be satisfied, said creating said first control card comprising:
labeling said first control card said list comprising potential modifications to be made to said datastore; and
listing a first row of said second input data which satisfies said second condition and a target row in said first input data, wherein said first row satisfying said second condition is marked for insertion into said target row position contained within said first input data.

5. The method of claim 1, said third condition having been determined to be satisfied said creating said first control card comprising:
labeling said first control card said list comprising potential modifications to be made to said datastore; and
listing a first row of said first input data which satisfies said third condition and a target row in said first input data, wherein said first row satisfying said third condition is marked for insertion into said target row position in said first input data.

6. The method of claim 1, said first and said second condition having been determined to be satisfied, said creating said first control card comprising:
labeling said first control card said list comprising potential modifications to be made to said datastore;
listing a first row of said first input data which satisfies said first condition, wherein said first row satisfying said first condition is marked for removal from said first input data; and
listing a first row of said second input data which satisfies said second condition and a target row in said first input data, wherein said first row satisfying said second condition is marked for insertion into said target row position of said first input data.

7. The method of claim 1, said first and said third condition having been determined to be satisfied, said creating said first control card comprising:
labeling said first control card said list comprising potential modifications to be made to said datastore;
listing a first row of said first input data which satisfies said first condition, wherein said first row satisfying said first condition is marked for removal from said first input data; and
listing a first row of said first input data which satisfies said third condition and a target row in said first input data, wherein said first row satisfying said third condition is marked for insertion into said target row position of said first input data.

8. The method of claim 1, said second and said third condition having been determined to be satisfied, said creating said first control card comprising:
labeling said first control card said list comprising potential modifications to be made to said datastore;
listing a first row of said second input data which satisfies said second condition and a target row in said first input data, wherein said first row satisfying said second condition is marked for insertion into said target row position in said first input data; and
listing a first row of said first input data which satisfies said third condition and a target row in said first input data, wherein said first row satisfying said third condition is marked for insertion into said target row position of said first input data.

9. The method of claim 1, said first said second and said third condition having been determined to be satisfied, said creating said first control card comprising:
- labeling said first control card said list comprising potential modifications to be made to said datastore;
- listing a first row of said first input data which satisfies said first condition, wherein said first row satisfying said first condition is marked for removal from said first input data;
- listing a first row of said second input data which satisfies said second condition and a target row in said first input data, wherein said first row satisfying said second condition is marked for insertion into said target row position of said first input data; and
- listing a first row of said first input data which satisfies said third condition and a target row in said first input data, wherein said first row satisfying said third condition is marked for insertion into said target row position of said first input data.

10. The method of claim 1, said receiving from said complex application a first modified first output data comprising:
- removing said first output data from said datastore; and
- storing said first modified first output data in said datastore.

11. The method of claim 1, said comparing said first modified first output data with said second output data comprising:
- determining if a fourth condition has been determined to be satisfied, said fourth condition being that at least one row in said first modified first output data does not match a target row in said second output data, wherein said target row is in the identical position in said second output data as said row satisfying said fourth condition is in respect to said first modified first output data.

12. The method of claim 11, said sending results from said comparing said first modified first output data with said second output data to an application expert comprising:
- creating a third control card, wherein said third control card comprises a list of discrepancies, wherein said list of discrepancies consists of at least one row which satisfies said fourth condition; and
- after said creating said third control card, sending said third control card to said application expert.

13. The method of claim 12, said fourth condition having been determined to be satisfied, said creating a third control card comprising:
- labeling said third control card said list of discrepancies; and
- listing a first row of said first modified first output data which satisfies said fourth condition.

14. The method of claim 1, said method further comprising:
- receiving a third input data and a third output data for a third release of said complex application;
- after said receiving said third input data and said third output data, comparing said first input data to said third input data;
- after said receiving said third input data and said third output data, comparing said second input data to said third input data;
- after said comparing said first input data to said third input data, modifying said first input data, wherein said modifying said first input data renders said first input data compliant for a third release of said complex application;
- after said comparing said second input data to said third input data, modifying said second input data, wherein said modifying said second input data renders said second input data compliant for a third release of said complex application;
- after said modifying said first input data, sending a second modified first input data to said complex application for regression testing;
- after said modifying said second input data, sending a modified second input data to said complex application for regression testing;
- after said sending said second modified first input data to said complex application, receiving from said complex application a second modified first output data;
- after sending said modified second input data to said complex application, receiving from said complex application a modified second output data;
- after said receiving from said complex application said second modified first output data, comparing said second modified first output data with said third output data;
- after said receiving from said complex application said modified second output data, comparing said modified second output data with said third output data; and
- sending result from both said comparing said second modified first output data with said third output data and said comparing said modified second output data with said third output data to said application expert.

15. A computer program product, comprising a computer readable storage device having a computer-readable program code stored therein, said computer-readable program code containing instructions that when executed by a processor of a computer system implement a method for building a datastore for storing and retrieving regression testing data for a complex application, said method comprising:
- creating said datastore for said complex application to manage data for regression testing, wherein said datastore is a database table consisting of a plurality of rows and a plurality of columns residing in a relational database environment;
- after said creating, receiving a first input data, a first output data, a second input data, and a second output data for said complex application;
- after said receiving said first input data, said first output data, said second input data, and said second output data, comparing said first input data to said second input data;
- after said comparing said first input data to said second input data, modifying said first input data, wherein said modifying renders said first input data compliant for a second release of said complex application;
- after said modifying, sending a first modified first input data to said complex application for regression testing;
- after said sending said first modified first input data, receiving from said complex application a first modified first output data;
- after said receiving from said complex application said first modified first output data, comparing said first modified first output data with said second output data; and
- sending result from said comparing said first modified first output data with said second output data to an application expert,
- said comparing said first input data to said second input data comprising:
- determining if a first condition is satisfied, said first condition being that at least one row in said first input data does not match any row in said second input data;
- determining if a second condition is satisfied, said second condition being that at least one row in said second input data does not match any row in said first input data;

determining if a third condition is satisfied, said third condition being that at least one row in said first input data matches a target row in said second input data but said row in said first input data is in a different position in said first input data first than said target row in said second input data is in said second input data;

after said determining if said first condition is satisfied, said determining if said second condition is satisfied, and said determining if said third condition is satisfied, creating a first control card, wherein said first control card comprises a list of potential modifications to perform on said first input data, wherein said list of potential modifications is selected from the group consisting of at least one row which satisfies said first condition, at least one row which satisfies said second condition, at least one row which satisfies said third condition, and a combination thereof;

sending said first control card to said application expert; and after said sending said first control card to said application expert, receiving a second control card from said application expert, wherein said second control card comprises a list of approved modifications to perform on said first input data, wherein said list of approved modifications is selected from the group consisting of a subset of said list of potential modifications, at least one additional modification, and a combination thereof.

16. The computer program product of claim 15, said receiving a first input data, a first output data, a second input data, and a second output data for said complex application comprising:

receiving said first input data and said first output data;

receiving said second input data and said second output data;

storing said first input data and said first output data in said datastore; and storing said second input data and said second output data in said datastore.

17. A computing system comprising a processor coupled to a computer-readable memory unit, said memory unit comprising a software application, said software application comprising instruction that when executed by said processor, implement a method for building a datastore for storing and retrieving regression testing data for a complex application, said method comprising:

creating said datastore for said complex application to manage data for regression testing, wherein said datastore is a database table consisting of a plurality of rows and a plurality of columns residing in a relational database environment;

after said creating, receiving a first input data, a first output data, a second input data, and a second output data for said complex application;

after said receiving said first input data, said first output data, said second input data, and said second output data, comparing said first input data to said second input data;

after said comparing said first input data to said second input data, modifying said first input data, wherein said modifying renders said first input data compliant for a second release of said complex application;

after said modifying, sending a first modified first input data to said complex application for regression testing;

after said sending said first modified first input data, receiving from said complex application a first modified first output data;

after said receiving from said complex application said first modified first output data, comparing said first modified first output data with said second output data; and sending result from said comparing said first modified first output data with said second output data to an application expert, said comparing said first input data to said second input data comprising:

determining if a first condition is satisfied, said first condition being that at least one row in said first input data does not match any row in said second input data;

determining if a second condition is satisfied, said second condition being that at least one row in said second input data does not match any row in said first input data;

determining if a third condition is satisfied, said third condition being that at least one row in said first input data matches a target row in said second input data but said row in said first input data is in a different position in said first input data first than said target row in said second input data is in said second input data;

after said determining if said first condition is satisfied, said determining if said second condition is satisfied, and said determining if said third condition is satisfied, creating a first control card, wherein said first control card comprises a list of potential modifications to perform on said first input data, wherein said list of potential modifications is selected from the group consisting of at least one row which satisfies said first condition, at least one row which satisfies said second condition, at least one row which satisfies said third condition, and a combination thereof;

sending said first control card to said application expert; and after said sending said first control card to said application expert, receiving a second control card from said application expert, wherein said second control card comprises a list of approved modifications to perform on said first input data, wherein said list of approved modifications is selected from the group consisting of a subset of said list of potential modifications, at least one additional modification, and a combination thereof.

18. A process for supporting computer infrastructure, said process comprising providing at least one support service for at least one of creating, integrating, hosting, maintaining, and deploying computer-readable code in a computing system, wherein said code in combination with the computing system is capable of implementing a method for building a datastore for storing and retrieving regression testing data for a complex application, said method comprising:

creating said datastore for said complex application to manage data for regression testing, wherein said datastore is a database table consisting of a plurality of rows and a plurality of columns residing in a relational database environment;

after said creating, receiving a first input data, a first output data, a second input data, and a second output data for said complex application;

after said receiving said first input data, said first output data, said second input data, and said second output data, comparing said first input data to said second input data;

after said comparing said first input data to said second input data, modifying said first input data, wherein said modifying renders said first input data compliant for a second release of said complex application;

after said modifying, sending a first modified first input data to said complex application for regression testing;

after said sending said first modified first input data, receiving from said complex application a first modified first output data;
after said receiving from said complex application said first modified first output data, comparing said first modified first output data with said second output data; and
sending result from said comparing said first modified first output data with said second output data to an application expert,
said comparing said first input data to said second input data comprising:
determining if a first condition is satisfied, said first condition being that at least one row in said first input data does not match any row in said second input data;
determining if a second condition is satisfied, said second condition being that at least one row in said second input data does not match any row in said first input data;
determining if a third condition is satisfied, said third condition being that at least one row in said first input data matches a target row in said second input data but said row in said first input data is in a different position in said first input data first than said target row in said second input data is in said second input data;
after said determining if said first condition is satisfied, said determining if said second condition is satisfied, and said determining if said third condition is satisfied, creating a first control card, wherein said first control card comprises a list of potential modifications to perform on said first input data, wherein said list of potential modifications is selected from the group consisting of at least one row which satisfies said first condition, at least one row which satisfies said second condition, at least one row which satisfies said third condition, and a combination thereof;
sending said first control card to said application expert; and
after said sending said first control card to said application expert, receiving a second control card from said application expert, wherein said second control card comprises a list of approved modifications to perform on said first input data, wherein said list of approved modifications is selected from the group consisting of a subset of said list of potential modifications, at least one additional modification, and a combination thereof.

* * * * *